United States Patent
Lee

(10) Patent No.: US 9,727,704 B2
(45) Date of Patent: *Aug. 8, 2017

(54) METHOD FOR SUPPORTING POST BROWSING IN MOVING RIGHTS OBJECT OF DIGITAL RIGHTS MANAGEMENT AND TERMINAL THEREOF

(75) Inventor: Seung-Jae Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

This patent is subject to a terminal disclaimer.

(21) Appl. No.: 13/407,259

(22) Filed: Feb. 28, 2012

(65) Prior Publication Data

US 2012/0198009 A1 Aug. 2, 2012

Related U.S. Application Data

(63) Continuation of application No. 12/671,454, filed as application No. PCT/KR2008/005076 on Aug. 29, 2008, now Pat. No. 8,161,103.

(60) Provisional application No. 60/969,382, filed on Aug. 31, 2007.

(30) Foreign Application Priority Data

Jan. 2, 2008 (KR) ............... 10-2008-0000364
Aug. 13, 2008 (KR) ............... 10-2008-0079644

(51) Int. Cl.
*G06F 15/16* (2006.01)
*G06F 21/10* (2013.01)

(52) U.S. Cl.
CPC ...... *G06F 21/10* (2013.01); *G06F 2221/0795* (2013.01)

(58) Field of Classification Search
CPC .......... G06F 2221/2129; G06F 21/105; G06F 2221/2141; G06F 21/10; G06F 2221/0753; H04L 2209/603; H04L 63/10; H04L 2463/101; H04L 63/0281; H04L 67/28

See application file for complete search history.

(56) References Cited

U.S. PATENT DOCUMENTS

| 6,006,332 | A  | * | 12/1999 | Rabne et al. ............... 726/6 |
| 6,161,121 | A  | * | 12/2000 | Hardy et al. ............... 718/104 |
| 6,728,773 | B1 | * | 4/2004  | Corless ..................... 709/229 |
| 7,133,917 | B2 | * | 11/2006 | Re ...................... G06F 21/121 709/217 |
| 7,526,451 | B2 |   | 4/2009  | Park et al. |
| 8,595,848 | B2 | * | 11/2013 | Lee ...................... G06F 21/10 726/26 |

(Continued)

FOREIGN PATENT DOCUMENTS

EP 1241606 A2 * 9/2002 ............ G06Q 20/12
KR 10-2005-0108571 A 11/2005

(Continued)

*Primary Examiner* — Farid Homayounmehr
*Assistant Examiner* — Lizbeth Torres-Diaz
(74) *Attorney, Agent, or Firm* — Birch, Stewart, Kolasch & Birch, LLP

(57) ABSTRACT

A digital rights management (DRM) including a transfer of a rights object (RO) to a second user in consideration of requirements of a movement of a rights object of a first user (a terminal, an equipment), charge, etc., by providing a post browsing session when the rights object occupied by the first user is transferred to a second user via a server.

5 Claims, 5 Drawing Sheets

(56) References Cited

U.S. PATENT DOCUMENTS

| | | | |
|---|---|---|---|
| 2001/0049732 A1* | 12/2001 | Raciborski | G06F 17/30864 709/224 |
| 2003/0126266 A1* | 7/2003 | Peles | H04L 69/40 709/228 |
| 2004/0039822 A1* | 2/2004 | Bensimon | G06F 17/30899 709/227 |
| 2004/0125126 A1* | 7/2004 | Egawa | G11B 27/031 715/716 |
| 2006/0271493 A1* | 11/2006 | Stefik | G06F 21/10 705/59 |
| 2007/0038576 A1 | 2/2007 | Lee | |
| 2007/0124481 A1* | 5/2007 | Bloebaum | H04W 4/02 709/227 |
| 2007/0124583 A1* | 5/2007 | Andersson et al. | 713/165 |
| 2007/0150417 A1* | 6/2007 | Hu | G06F 21/10 705/59 |
| 2007/0198419 A1* | 8/2007 | Park et al. | 705/52 |
| 2007/0265932 A1 | 11/2007 | Im et al. | |
| 2007/0265981 A1* | 11/2007 | Kim | G06F 21/10 705/59 |
| 2007/0266932 A1* | 11/2007 | Hiramatsu | 117/88 |
| 2008/0127177 A1* | 5/2008 | Oh et al. | 717/174 |
| 2008/0163377 A1* | 7/2008 | Lee et al. | 726/26 |
| 2008/0244049 A1* | 10/2008 | Normark | H04L 41/0226 709/223 |
| 2010/0212022 A1* | 8/2010 | Greevenbosch et al. | 726/27 |
| 2011/0231511 A1* | 9/2011 | Mo | H04L 67/2814 709/217 |
| 2011/0277008 A1* | 11/2011 | Smith | H04N 21/2385 725/116 |

FOREIGN PATENT DOCUMENTS

| | | |
|---|---|---|
| KR | 10-2007-0098417 A | 10/2007 |
| WO | WO 03/005145 A2 | 1/2003 |
| WO | WO 2006/117555 A2 | 11/2006 |
| WO | WO 2007/021108 A1 | 2/2007 |
| WO | WO 2007/086697 A1 | 8/2007 |
| WO | WO 2009/028898 A2 | 3/2009 |

* cited by examiner

METHOD FOR SUPPORTING POST BROWSING IN MOVING RIGHTS OBJECT OF DIGITAL RIGHTS MANAGEMENT AND TERMINAL THEREOF

This application is a Continuation of Application Ser. No. 12/671,454, filed on Jan. 29, 2010 (now U.S. Pat. No. 8,161,103 issued on Apr. 17, 2012), which is the National Phase of PCT International Application No. PCT/KR2008/005076 filed on Aug. 29, 2008, which claims priority under 35 U.S.C. §119(e) to U.S. Provisional Application No. 60/969,382 filed on Aug. 31, 2007, and claims priority under 35 U.S.C. §119(a) to Patent Application No. 10-2008-0000364 filed in the Republic of Korea on Jan. 2, 2008 and to Patent Application No. 10-2008-0079644 filed in the Republic of Korea on Aug. 13, 2008, all of which are hereby expressly incorporated by reference into the present application.

TECHNICAL FIELD

The present invention relates to a digital rights management (DRM), and more particularly, to transferring a rights object (RO) to a second user by considering a requirement of a first user (a terminal, an equipment) when the rights object occupied by the first user is transferred to a second user via a server.

BACKGROUND ART

A Digital Rights Management (DRM) system is a technology for securely protecting and systematically managing a rights object of digital contents, and provides a series of protection and management systems related to the prevention of illegal copy of digital contents and acquisition of rights object of the digital contents, generation and circulation of the digital contents, and procedures of use of the digital contents. The DRM has been applied to a variety of applications, such as a media player, an audio player, an image viewer, and the like.

FIG. 1 is a schematic view of a digital rights management system. The digital rights management system controls digital contents provided from a contents provider to a user such that the user is able to use the digital contents as much as rights object granted to the user. Here, the contents provider is an entity corresponding to a Contents Issuer (CI) and/or a Rights Issuer (RI).

The Contents Issuer (CI) issues contents (Le., DRM contents) protected using a specific encoding key so as to protect the DRM contents from users having no access rights, and the Rights Issuer (RI) issues Rights Object (RO) required to use the protected contents.

A DRM agent installed in a terminal receives the protected contents and rights object, and controls a use of the contents by analyzing a license included in the rights object and converting the protected contents into a form suitable for being used in a corresponding terminal.

FIG. 2 is a signal flowchart illustrating a related art method for moving, by a first terminal (a terminal of a first user), a rights object occupied by the first terminal to a second terminal (a terminal of a second user) through an RI. The first terminal is a source terminal which desires to move a rights object, while the second terminal is a target terminal which receives the rights object. In the related art shown in FIG. 2, after receiving a trigger message for moving a rights object from an RI (S1), the first terminal sends a request message (MoveRightsRequest) for moving a rights object (e.g., RO1, RO2 and RO3) occupied by (belonging to) the first terminal (S2). The RI sends to the first terminal a message (MoveRightsResponse) in response to the request message (S3), and moves the rights object (i.e., RO1, RO2 and RO3) requested by the first terminal to the second terminal (S4).

In the related art as shown in FIG. 2, the source terminal moves the rights object occupied by the source terminal to the target terminal through the RI, however, requirements for moving the rights object of the source terminal, etc. are not considered.

DISCLOSURE OF THE INVENTION

Therefore, it is an object of the present invention to provide a method for considering requirements for moving a rights object desired by a source terminal and/or a target terminal, when the source terminal wants to move a rights object occupied by the source terminal through a server (e.g., an RI).

To achieve this object, there is provided a method for supporting a post browsing in moving a rights object in digital rights management according to the present invention, including:

(A) transferring, by a first terminal, a request message to a server so as to move a rights object occupied by the first terminal to a second terminal;

(B) receiving, by the first terminal, a response message including address information (e.g., a PR-URL) from the server;

(C) checking, by the first terminal, whether or not the address information is included in the response message; and (D) connecting, by the first terminal, to a server managing charge and payment information by using the address information, and performing a browsing session.

Preferably, the step (D) includes: checking, by the first terminal, charge and payment information of a rights object to be moved to the second terminal; and changing or modifying, by the first terminal, the rights object to be moved to the second terminal.

Preferably, there is further included a step of moving, by the server, the changed or modified rights object to the second terminal.

Preferably, there are further included steps of inquiring and answering, by the server in cooperation with the second terminal, about charge/payment information or charge/payment condition of the changed or modified rights object; and moving, by the server, the rights object to the second terminal based on the inquiry and answer.

Preferably, there is further included a step of disabling, by the first terminal, the rights object.

Preferably, there is further included a step of deleting, by the first terminal, the rights object.

To achieve this object, in a method for moving a rights object between terminals through a server, there is provided a method for moving a rights object in digital rights management according to the present invention, including:

receiving, by a first terminal, a response message in response to a request for moving at least one or more rights objects from a server; checking, by the first terminal, whether or not address information (e.g., a PR-URL) is included in the response message; performing, by the first terminal, a browsing session by using the address information; and changing, by the first terminal, the rights objects through the browsing session.

Preferably, there is further included a step of moving, by the server, the changed rights objects to a second terminal.

In addition, to achieve this object, there is provided a terminal according to the present invention, including: a receiver configured to receive a response message including address information (e.g., PR-URL) with respect to a request for moving a rights object; and a controller configured to check whether or not the address information is included in the received response message, perform a browsing session by using the address information, and change the rights object to be moved.

Effect

First, from a perspective of a terminal user, the present invention may consider a variety of requirements of the terminal user (viewing charge information, adding/removing a rights object to be moved, or the like) when a terminal moves a rights object to another terminal, even after the terminal transferred the rights object to the server (RI).

Second, from a perspective of a service provider, the present invention allows the service provider to develop a variety of business scenarios as well as to provide a flexible digital contents service to a user, since the terminal can view charge information of the rights object or modify (e.g., addition, deletion, etc.) the rights object to be moved even after the terminal transferred the rights object to be moved to another terminal to the server.

MODES FOR CARRYING OUT THE PREFERRED EMBODIMENTS

Figure 1:
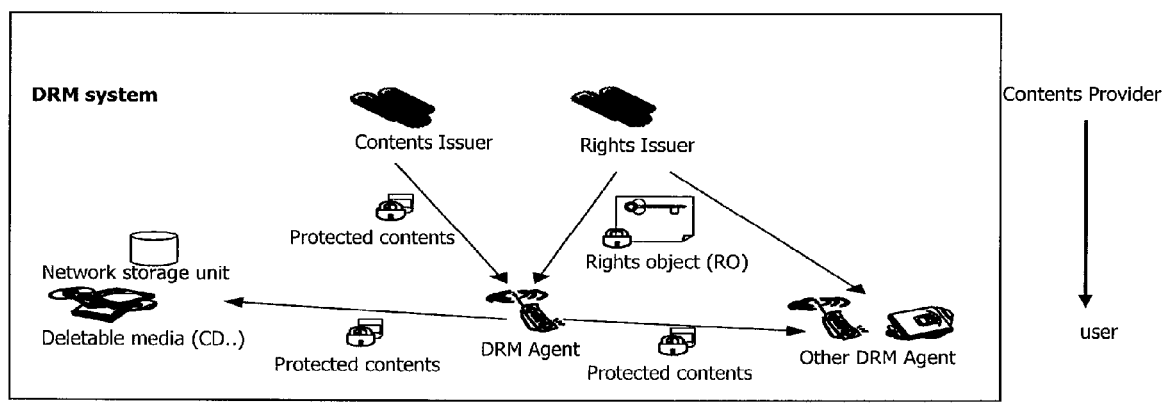
FIG. 1 is a schematic view of a digital rights management system.
Figure 2:
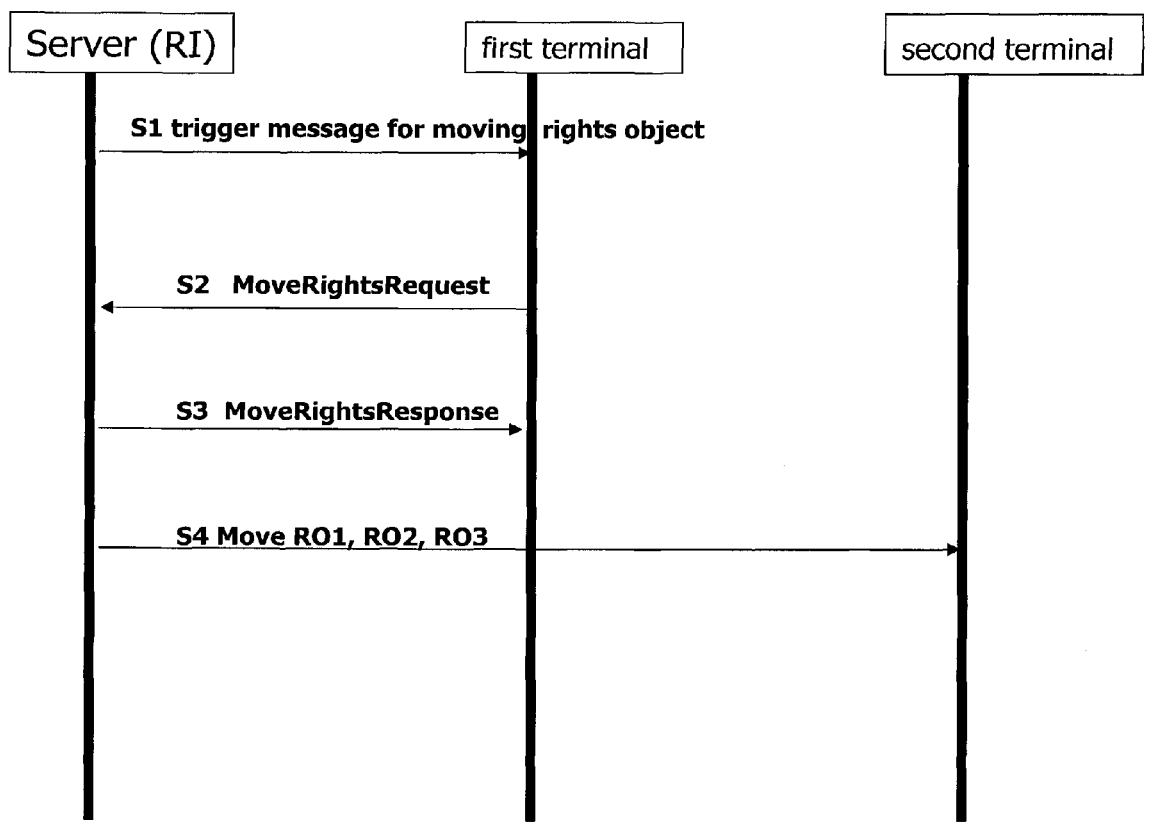
FIG. 2 is a signal flowchart illustrating a related art method for moving, by a first terminal (a terminal of a first user), a rights object occupied by the first terminal to a second terminal (a terminal of a second user) through an RI.

The present invention is applied to a Digital Rights Management (DRM) system. However, the present invention is not limited to the DRM system, and may also be applied to all communication systems and methods thereof to which the technical scope of the present invention may be applied, and other rights related system and method thereof.

Various modifications and embodiments can be made in the present invention, and reference will be made in detail to the preferred embodiments of the present invention, examples of which are illustrated in the accompanying drawings. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Though terms including ordinal numbers such as a first, a second, etc. may be used to explain various components, the components are not limited to the terms. The terms are used only for the purposed of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Reference will now be given in detail to the preferred embodiments of the present invention, examples of which are illustrated in the accompanying drawings. Wherever possible, the same reference numerals will be used throughout the drawings to refer to the same or'similar parts, and the same descriptions thereof are omitted.

The present invention conceptually relates to considering requirements (e.g., charge information, payment information, and the like) of a source terminal and/or a target terminal when a rights object is moved between terminals (i.e., the source terminal and the target terminal) through a specific server (e.g., an RI). That is, first, if the source terminal requests to move the rights object, the server sends a response message by including a parameter indicating a specific address (also referred to as 'specific address information') therein, second, the source terminal connects to a server of the specific address (e.g., a web address of a server, an address of a server in responsible for charge and additional information, or the like) included in the response message and thereby to check or modify the charge information and/or additional information of the rights objects to be moved, and third, the server moves the rights objects to the target terminal based on the checked or modified charge information and/or additional information. In particular, in order to describe exemplary embodiments of the present invention, the parameter indicating the specific address (or specific address information) included in the response message is defined as the 'Post Response Uniform Resource Locator (URL)' (in short, PR-URL). However, the technical scope of the present invention is not limited to a formal meaning of the defined term, and may also be applied to all terms to which the technical characteristic of the present invention is implemented.

A Rights Object Acquisition Protocol (ROAP) is a protocol used to move a rights object between terminals through a server. Hereinafter, descriptions of parameters included in a request message (MoveRightsRequest) of a ROAP for moving a rights object and a response message (MoveRightsResponse) according to the present invention will be given.

Table 1 shows parameters included in a request message for moving a rights object. The message is a message sent from the source terminal (first terminal) to the server. In Table 1, the parameter M (Mandatory) indicates a parameter which should be mandatorily included, and the parameter O (Optional) indicates a parameter which may be optionally included.

TABLE 1

| Parameter | ROAP-MoveRightsRequest |
| --- | --- |
| Device ID | M |
| RI ID | M |
| Device Nonce | M |
| Request Time | M |
| Recipient Device ID | O |
| Rights Info | M |
| Certificate Chain | O |
| Extnesions | O |
| Signature | M |

In Table 1, the "Device ID" is a parameter indicating an ID (identification) of a source terminal. The "RI ID" is a parameter indicating an ID of a server (RI) receiving a request message (MoveRightsRequest) which is sent from the source terminal. The "Device Nonce," as a random number, is a parameter included in a response message (MoveRightsResponse) to be sent by the server and used to check whether it is a response to the request message. The "Request Time" is a parameter indicating a transmission time of the request message. The "Recipient Device ID" is a parameter indicating an ID of a receiving terminal to which the source terminal desires to move (transfer) the rights object, that is, an ID of a target terminal. The "Rights Info" is a parameter including information related to a rights object transferred from the source terminal to the server. The "Certificate Chain" is a parameter indicating a certificate chain of the source terminal transmitting the request message. The "Signature," as a digital signature for the entire request message, is a parameter indicating a digital signature value generated by the source terminal.

Table 2 shows parameters included in a response message with respect to the request message in Table 1. The response message is a message sent to the source terminal (first terminal) from the server. In Table 2, the parameter M (Mandatory) indicates a parameter which should be mandatorily included, and the parameter O (Optional) indicates a parameter which may be optionally included.

TABLE 2

| | ROAP-MoveRightsResponse | |
| --- | --- | --- |
| Parameter | Status = Success | Status ≠ Success |
| Status | M | M |
| Device ID | M | M |
| RI ID | M | M |
| Device Nonce | M | M |
| Certificate Chain | O | — |
| OCSP Response | O | — |
| Post Response URL | O | — |
| Extensions | O | — |
| Signature | M | M |

In Table 2, the "Status" is a parameter indicating a processing state of the request message. The "Device ID" is a parameter indicating an ID of a source terminal receiving the response message. The "RI ID" is a parameter indicating an ID of a server (RI) sending the response message. The "Device Nonce" should have the same value as that of the "Device Nonce" included in the request message. The "Certificate Chain" is a parameter indicating a certificate chain of the server. The "OCSP Response" is a parameter including information indicating whether or not a certificate of a server is discarded if the source terminal requests an OCSP Response in the request message. The "Signature" is a parameter indicating, by the server, a digital signature value for the entire response message. The "Post Response URL," as a parameter newly defined in the present invention, includes address-related information of a server (a web server) capable of inputting charge information or additional information related to moving a rights object.

The present invention relates to supporting a Post Browsing by connecting to a server of an address included in the parameter "Post Response URL" (or 'address information'). Here, the post browsing refers to changing, modifying, inquiring, etc. additional information with respect to the rights object to be moved, after messages for moving a rights object are exchanged between the server (RI) and the terminal (a source terminal) in relation to the movement of the rights object.

Figure 3:
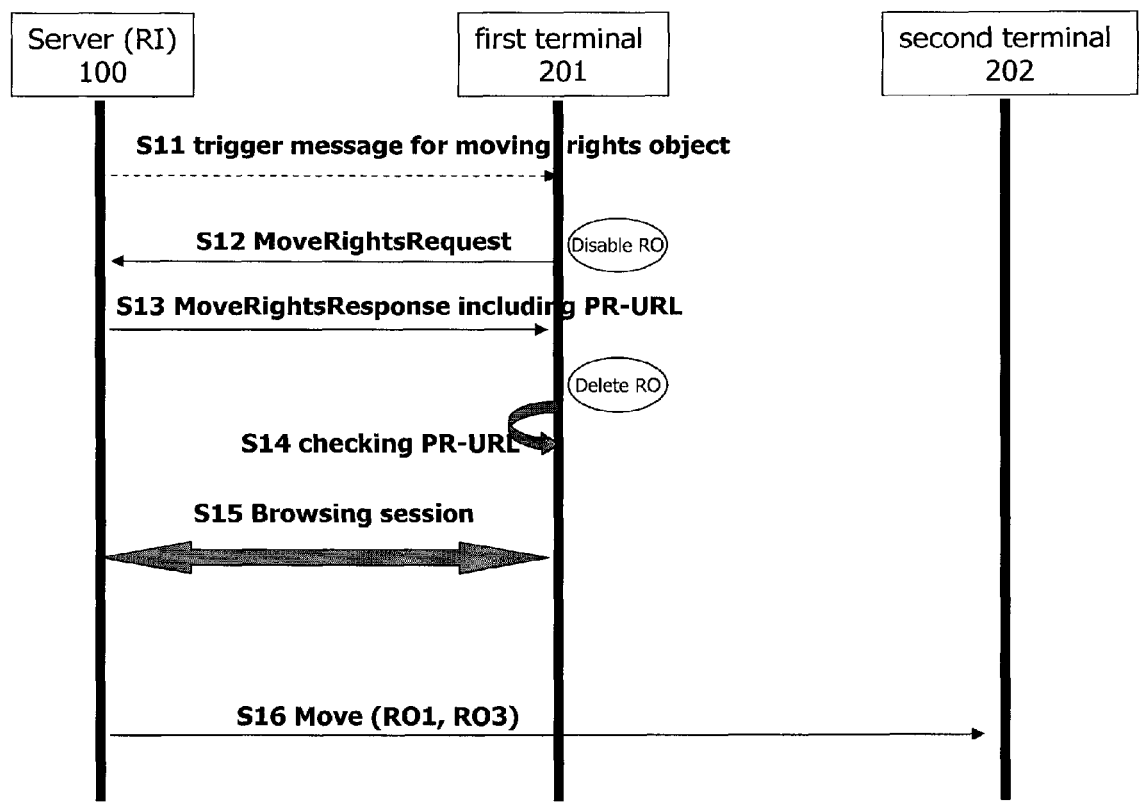
FIG. 3 is a signal flowchart illustrating a method for supporting a post browsing in moving a rights object in digital rights management according to one embodiment of the present invention.

FIG. 3 is a signal flowchart illustrating a method for supporting a post browsing in moving a rights object in digital rights management according to one embodiment of the present invention. In FIG. 3, a first terminal 201 is a source terminal for moving (transferring) a rights object of the first terminal 201 through a server 100, and a second terminal 202 is a target terminal for receiving the rights object transferred by the first terminal 201 through the server 100. In addition, in FIG. 3, the server 100 is assumed to be a Rights Issuer (RI), however, the server 100 may also be an entity, other than the RI.

Referring to FIG. 3, a protocol (e.g., a 2-way ROAP Acquisition) for moving a rights object between the server 100 and the first terminal 201 is proceeded. That is, the first terminal 201 receives a trigger message from the server 100 indicating a start of the movement of the rights object (S11). Here, the trigger message is an optional message which can be selectively received from the server 100 so as to move the rights object of digital contents in the first terminal 201.

The first terminal 201 transmits, to the server 100, a request message (MoveRightsRequest) for moving rights objects (e.g., RO1, RO2 and RO3) occupied by the first terminal 201 to the second terminal 202 (S12). Here, the first terminal 201 may disable the rights objects. Here, the disablement of the rights objects signifies a state that the rights objects cannot be used. And, the request message (MoveRightsRequest) may include the parameters as shown in Table 1.

In response to the request message in step (S12), the server 100 transmits a response message (MoveRightsResponse) to the first terminal 201 (S13). Here, the response message includes a PR-URL parameter. The PR-URL parameter includes an address of the server 100 capable of performing the post browsing procedure (e.g., an address of a web server: here, the address of the server in FIG. 3 is the address of the RI.). The first terminal 201 receives the response message, and checks whether or not the PR-URL parameter is included in the response message (S14).

And, the first terminal uses an address indicated by the PR-URL so as to connect to a corresponding server of the address and initiate (start) a post browsing session with the server 100 (S15). For instance, a user of the first terminal 201 may inquire, by using the post browsing session, about a cost required to move the rights object having been transferred to the server 100 to the second terminal 202, and pay the inquired cost according to a determination of the user. As another example, it is assumed that the first terminal 201 moves (transfers) rights objects (e.g., RO1, RO2 and RO3) occupied by the first terminal 201 to the second terminal 202. Here, through the post browsing session in step (S15), the first terminal 201 may check, for instance, charge-related information of the rights objects to be transferred to the second terminal 202 (e.g., the cost for moving RO1 or RO3 is "1,000" and the cost of moving RO2 is "3,000"), and accordingly, the user of the first terminal 201 may intend to move the rights object only which requires an inexpensive moving cost. Here, the user of the first terminal 201 may select rights objects only (e.g., RO1 and RO3 only) which are desired to actually move to the second terminal among the rights objects (i.e., RO1, RO2 and RO3). That is, the first terminal 201 may change and modify a list of rights objects desired to transfer by performing the post browsing session with the server 100. Consequently, the first terminal 201 deletes a portion (i.e., RO2) of its rights objects in the post browsing session due to a reason including a transmission cost, or the like.

Based on the post browsing performed in step (S15), the server 100 transmits, to the second terminal 202, the rights objects (i.e., RO1 and RO3) requested by the first terminal 201 (S16).

In step (S14), the first terminal may consider the response message (MoveRightsResponse) as an acknowledgement of the request message (MoveRightsRequest) in step (S12), and delete the rights objects (e.g., RO1~RO3) to be moved.

Figure 4:
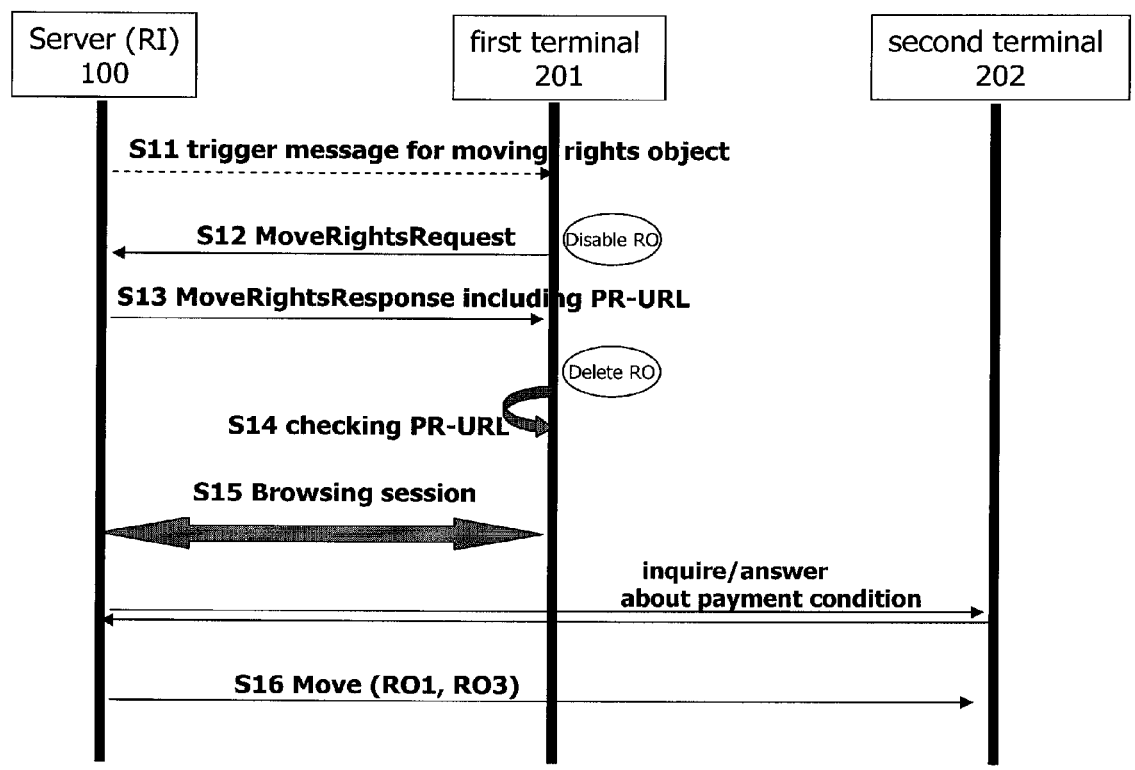
FIG. 4 is a signal flowchart illustrating a method for supporting a post browsing in moving a rights object in digital rights management according to another embodiment of the present invention.

FIG. 4 is a signal flowchart illustrating a method for supporting a post browsing in moving a rights object in digital rights management according to another embodiment of the present invention. In the embodiment in FIG. 4, signal flows in FIG. 4, which have the same reference numerals as those in the embodiment shown in FIG. 3, are the same as the corresponding signal flows in FIG. 3 in operations and functions thereof. Therefore, descriptions of the signal flows in FIG. 4 will refer to those of the respective signal flows in FIG. 3.

The embodiment in FIG. 4, when compared to that in FIG. 3, may further include inquiring and answering about charge/payment condition of a rights object to be transferred between the server 100 and the second terminal 202 after the post browsing session (S15). That is, the server 100 inquires of the second terminal 202 whether or not the rights object changed in step (S15) (i.e., transferring the RO1 and RO3 only, instead of transferring the RO1~RO3) should be received. In response to this, the second terminal 202 may inquire about charge/payment condition of the rights objects to be transferred, or may send a response which will check charge/payment condition for the rights objects to be transferred provided by the server 100 and then receive the rights objects.

Figure 5:
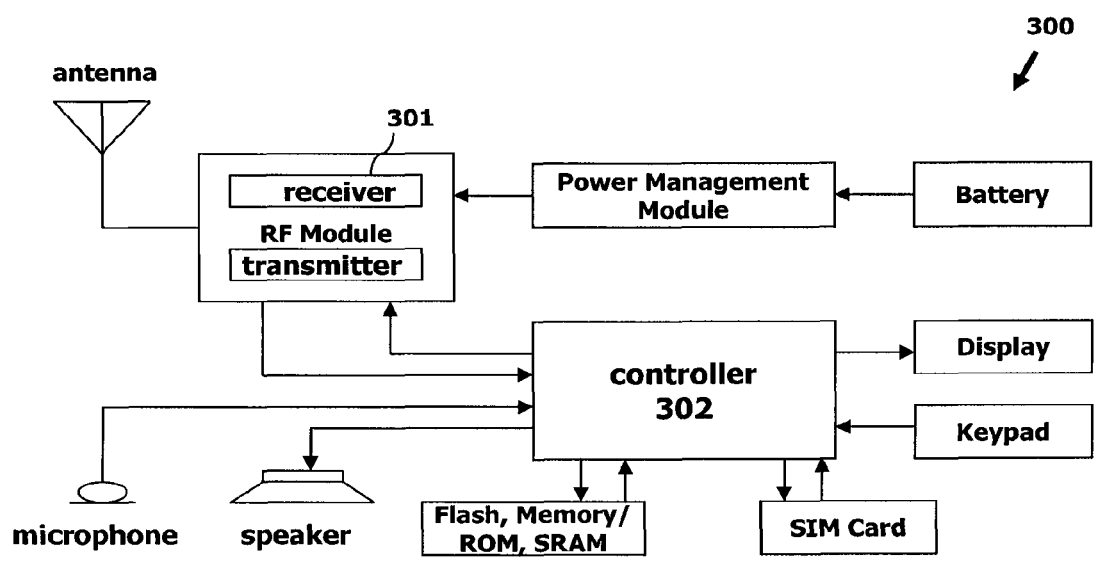
FIG. 5 is a schematic view of a terminal according to the present invention.

FIG. 5 is a schematic view of a terminal according to the present invention.

Hereinafter, description of a structure and an operation of a terminal according to the present invention will be given with reference to FIG. 5. The terminal 300 according to the present invention comprehensively includes all types of devices capable of using contents in DRM, such as all terminals for mobile communications (e.g., User Equipments (UEs), mobile phones, cellular phones, Digital Multimedia Broadcasting (DMB) phones, DVB-H phones, Personal Digital Assistant (PDA) phones, and PTT phones, and the like), digital TVs, GPS navigations, portable game players, MP3, other home appliances, and the like.

The terminal 300 according to the present invention may include a receiver 301 configured to receive a response message including a PR-URL with respect to a request for moving a rights object; and a controller 302 configured to check whether or not the PR-URL is included in the received response message, perform a browsing session by using the PR-URL, and change (or modify) the rights object to be moved in the browsing session or view charge/payment information. Here, the controller may also be referred to as a DRM agent.

In addition to the basic components as shown in FIG. 7, the terminal 300 according to the present invention may include all essential components of an equipment (terminal) necessary to use DRM contents. Here, other components in FIG. 7 are apparent to those skilled in the art, therefore detailed explanations thereof are omitted. The operations and functions of each component of the terminal 300 according to the present invention will be equally applied to the respective portions described in FIGS. 3 and 4.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for supporting a post browsing in moving rights information, the method comprising:
   transmitting, by a first UE and to a server, a request message to move at least one selected rights information to a second UE, wherein the at least one selected rights information is required to use at least one content and the request message includes information on the at least one selected rights information to be moved to the second UE;
   receiving, by the first UE, a response message in response to the request message from the server, the response message including address information being received prior to allowing the first UE to have a post-browsing session with the server for managing a charge and payment required to move the at least one selected rights information;
   checking, by the first UE, whether or not the address information is included in the response message; and prior to moving the at least one selected rights information to the second UE, connecting, by the first UE, to the server based on the address information received in the response message to perform the post-browsing session with the server; and
performing the post-browsing session to enable the first UE to:
determine rights information to be moved to the second UE by deselecting one or more rights information among the at least one selected rights information included in the request message
perform the managing of the charge and payment, and
move the determined rights information to the second UE based on the managed charge and payment,
wherein the address information is included in a Post Response (PR)-URL parameter.

2. The method of claim 1, wherein the determined rights information is moved by the server to the second UE after the post-browsing session.

3. A method for moving rights information between user equipments (UEs), the method performed by a server and comprising:
receiving, by the server and from a first UE, a request message to move at least one selected rights information to a second UE, wherein the at least one selected rights information is required to use at least one content and the request message includes information on the at least one selected rights information to be moved to the second UE;
transmitting, by the server and to the first UE, a response message in response to the request message, the response message including address information being received prior to allowing the first UE to have a post-browsing session with the server for managing a charge and payment required to move the at least one selected rights information;
prior to moving the at least one selected rights information to the second UE, connecting, by the server to the first UE, based on the address information received in the response message to perform the post-browsing session with the first UE; and
performing the post-browsing session to enable the first UE to:
determine rights information to be moved to the second UE by deselecting one or more rights information among the at least one selected rights information included in the request message,
perform the managing of the charge and payment, and
move the determined rights information to the second UE based on the managed charge and payment; and
transmitting, by the server, the determined rights information to the second UE after the post-browsing session,
wherein the address information is included in a Post Response (PR)-URL parameter.

4. A first user equipment (UE) configured to support a post-browsing in moving rights information, the first UE comprising:
a radio frequency (RF) unit configured to:
transmit to a server, a request message to move at least one selected rights information to a second UE, wherein the at least one selected rights information is required to use at least one content and the request message includes information on the at least one selected rights information to be moved to the second UE, and
receive, from the server, a response message in response to the request message,
the response message including address information being received prior to allowing the first UE to have a post-browsing session with the server for managing a charge and payment required to move the at least one selected rights information; and
a processor configured to:
check whether or not the address information is included in the response message, prior to moving the at least one selected rights information to the second UE, connect to the server based on the address information received in the response message to perform the post-browsing session with the server, and
perform the post-browsing session to enable the first UE to:
determine rights information to be moved to the second UE by deselecting one or more rights information among the at least one selected rights information included in the request message,
perform the managing of the a charge and payment, and
move the determined rights information to the second UE based on the managed charge and payment,
wherein the address information is included in a Post Response (PR)-URL parameter.

5. A server for moving rights information between user equipments (UEs), the server comprising:
a radio frequency (RF) unit configured to:
receive, from a first UE, a request message to move at least one selected rights information to a second UE, wherein the at least one selected rights information is required to use at least one content and the request message includes information on the at least one selected rights information to be moved to the second UE, and
transmit, to the first UE, a response message in response to the request message,
the response message including address information being received prior to allowing the first UE to have a post-browsing session with the server for managing a charge and payment required to move the at least one selected rights information; and
a processor configured to;
prior to moving the at least one selected rights information to the second UE, connect to the first UE, based on the address information received in the response message to
perform the post-browsing session with the first UE, and
perform the post-browsing session to enable the first UE to:
determine rights information to be moved to the second UE by deselecting one or more rights information among the at least one selected rights information included in the request message,
perform the managing of the charge and payment, and
move the determined rights information to the second UE based on the managed charge and payment, and
wherein the RF unit is further configured to transmit the determined rights information to the second UE after the post-browsing session, and
wherein the address information is included in a Post Response (PR)-URL parameter.

* * * * *